United States Patent
Van Der Hardt Aberson et al.

(10) Patent No.: US 8,840,515 B2
(45) Date of Patent: Sep. 23, 2014

(54) MOTOR VEHICLE TRANSMISSION HAVING A CONTROLLABLE DIFFERENTIAL

(75) Inventors: Frederik Ernst Carel Van Der Hardt Aberson, Lindau (DE); Klaus Muller, Meckenbeuren (DE); Uwe Firzlaff, Uhldingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 162 days.

(21) Appl. No.: 13/511,420

(22) PCT Filed: Nov. 24, 2010

(86) PCT No.: PCT/EP2010/068075
§ 371 (c)(1),
(2), (4) Date: May 23, 2012

(87) PCT Pub. No.: WO2011/069821
PCT Pub. Date: Jun. 16, 2011

(65) Prior Publication Data
US 2012/0289373 A1    Nov. 15, 2012

(30) Foreign Application Priority Data

Dec. 9, 2009   (DE) .......................... 10 2009 047 749

(51) Int. Cl.
*F16H 48/22*        (2006.01)
(52) U.S. Cl.
USPC ........................................................ 475/231
(58) Field of Classification Search
USPC ........................................................ 475/231
See application file for complete search history.

(56) References Cited

U.S. PATENT DOCUMENTS

| 4,811,628 | A |   | 3/1989 | Winkham et al. |
| 5,066,268 | A |   | 11/1991 | Kobayashi |
| 5,149,307 | A |   | 9/1992 | Malloy et al. |
| 6,001,039 | A | * | 12/1999 | Ohkubo et al. ............... 475/231 |
| 2008/0242469 | A1 |   | 10/2008 | Jenski et al. |

FOREIGN PATENT DOCUMENTS

| DE | 1 157 442 |    | 11/1963 |
| DE | 38 29 701 | A1 | 3/1986 |
| DE | 36 36 175 | A1 | 4/1988 |
| DE | 197 16 386 | A1 | 11/1997 |

* cited by examiner

*Primary Examiner* — Jacob S Scott
(74) *Attorney, Agent, or Firm* — Davis & Bujold, PLLC; Michael J. Bujold

(57) ABSTRACT

A motor vehicle transmission with a main chamber in which rotation of an input shaft is converted and transmitted to a main shaft connected to a housing of a differential gearbox. The housing can drive two output gears such that different rotational speeds of the output gears can be produced by compensating elements of the differential gearbox. A clutch, with one side connected to the housing and another side connected to the output gear concerned, is provided between one of the two output gears and the housing. The two sides couple due to a pressure build up. The actuating chamber is completely separated from the main chamber and, in the area of the differential gearbox, an impermeable membrane is provided as a separator, which changes its shape as pressure builds up in the actuating chamber and actuates the clutch via an actuating device.

11 Claims, 2 Drawing Sheets

MOTOR VEHICLE TRANSMISSION HAVING A CONTROLLABLE DIFFERENTIAL

This application is a national stage completion of PCT/EP2010/068075 filed Nov. 24, 2010 which claims priority from German Application Serial No. 10 2009 047 749.7 filed Dec. 9, 2009

FIELD OF THE INVENTION

The invention concerns a motor vehicle transmission having a main chamber in which rotation of an input shaft can be converted and transmitted to a main shaft which is connected to a housing of a differential gearbox, such that two output gears can be driven by means of the housing and different rotational speeds of the output gears can be produced by compensating elements, a frictional clutch being provided between one of the two output gears and the housing, which has a first side connected to the housing and a second side connected to the output gear concerned, such that the sides can be brought into contact with one another by building up pressure in an actuating chamber in order to couple the output gear concerned with the housing of the differential gearbox.

BACKGROUND OF THE INVENTION

In motor vehicles with internal combustion engines, transmissions are usually used in order to convert the speeds and torques provided by the internal combustion engine, as a function of the driving range at the time, into speeds and torques suitable for the propulsion of the motor vehicle. For reasons relating to driving stability and traction these converted speeds and torques must thereby be transmitted to at least one axle of the motor vehicle, i.e. the power available must be distributed at least to a driven wheel on the left and one on the right. However, the use of a common driveshaft for both driven wheels would give rise to the problem that when driving round curves the drive-train would be stressed and the wheels would be subjected to more severe wear and higher loading, since the wheel on the outside of the curve has to cover a larger distance than the wheel on the inside. For that reason a so-termed differential gearbox is usually provided between the motor vehicle transmission and the axle shafts of the driven wheels, which enables unconstrained speed and force compensation between the axle shafts of the driven wheels. For this purpose the power coming from the transmission of the motor vehicle is transmitted to a housing of the differential gearbox and, with the help of compensating elements, divided by it between two output gears arranged inside the housing, each connected to a respective axle shaft. When the motor vehicle is driving straight ahead, the compensating elements rotate together with the housing of the differential gearbox as a block and distribute the power supplied by the motor vehicle transmission uniformly to the two output gears and hence to the axle shafts. In contrast, when the motor vehicle is driving round a curve the compensating elements inside the housing undergo compensatory movement in order to enable the two output shafts to run at different speeds.

However, when the friction-grip potentials of the two driven wheels are different, the action of the differential gearbox has the decisive disadvantage that the propulsion forces that can be transmitted to the road depend on the lower of the friction-grip potentials. In an extreme situation the result is that if one driven wheel is spinning, no torque higher than that transmitted by the spinning wheel can be transmitted by the respective other wheel, so the motor vehicle cannot be driven at all, or only to a very limited extent. To overcome this drawback it is usual to provide blocking devices in the area of the differential gearbox, in order to suppress completely or at least impede the compensatory movement of the compensating elements.

From DE 38 29 701 A1 a differential gearbox is known in which, by means of a housing, output gears at least within the housing can be driven by compensating elements, so that different speeds of the output gears can be produced by corresponding compensatory movements of the compensating elements. To be able to selectively bridge across the action of the differential gearbox in certain situations, a friction clutch is provided between one of the output gears and the housing, which when actuated couples this output gear directly to the housing and in this way ensures that the rotational speed of the housing and the output gear are equal. A firm coupling of the output gear to the housing, by virtue of the compensating elements, brings about an entrainment of the respective other output gear at the same rotational speed and consequently forces a uniform division of the power between the two wheels. To actuate the friction clutch, an actuating chamber is provided in its area, which is delimited by a static and a working part and is filled with a hydraulic fluid. When pressure is built up in this actuating chamber the working part is moved toward the friction clutch and transmits this movement, via interposed elements, to one of the two sides of the clutch, so causing it to close. When the pressure in the actuating chamber is reduced, the clutch is opened by virtue of a return movement of the working part brought about by spring elements arranged in that area.

It is generally known that especially in front-wheel-drive motor vehicles, a differential gearbox of this type can be accommodated in a main chamber of the motor vehicle transmission, so that in this case the housing of the differential gearbox is driven by a main shaft. The rotation of the main shaft is produced by the converted transmission of rotation of an input shaft also arranged in the main chamber.

However, such a design of a motor vehicle transmission has the disadvantage that because of leakage the hydraulic fluid provided for actuating the friction clutch can make its way into the main chamber of the motor vehicle transmission, and can mix with the transmission oil present there, which is different from it. Particularly for the shifting processes taking place between the driveshaft and the main shaft, this transmission oil has tailor-made properties which are affected progressively adversely as more and more of the hydraulic fluid from the actuating chamber mixes with it. As a result, over its lifetime the shift quality of the motor vehicle transmission also deteriorates progressively.

SUMMARY OF THE INVENTION

Thus, the purpose of the present invention is to provide a motor vehicle transmission with an integrated differential gearbox, this differential gearbox comprising a clutch for blocking the differential action, but such that mixing of a hydraulic fluid provided for actuating the clutch with transmission oil present in the main chamber, is effectively prevented.

The invention is based on the technical principle that the actuating chamber is positioned completely separated from the main chamber, and in the area of the differential gearbox and between the main and actuating chambers an impermeable membrane is provided as a barrier, which undergoes a change of shape when pressure is built up in the actuating chamber and thereby actuates the clutch by means of an actuating device. Thanks to the complete separation of the actuating and main chambers, mixing of the hydraulic oil with the transmission oil can be completely excluded, so preventing any resulting deterioration of the shift quality. At the same time, by means of the membrane and the interposed actuating device the clutch can be reliably controlled for bridging across the action of the differential gearbox.

In accordance with an embodiment of the invention, the actuating device comprises a piston pre-stressed by a spring element against the side of the membrane opposite to the actuating chamber, and which converts the shape change of the membrane to translational movement for actuating the clutch. Thanks to the use of a piston and to the pre-stressing thereof together with the membrane, a shape change of the membrane can be transformed very precisely into a translational movement for actuating the clutch.

In a further development of the invention, a bearing, a pressure plate and a plurality of pressure bolts are positioned after the piston, such that during the translational movement of the piston the bolts come, with their ends facing away from the pressure plate, into contact with one of the two sides of the clutch. This has the advantage that by virtue of such an arrangement the actuating chamber can be positioned in the area of one of the output gears, while the clutch is provided in the area of the other output gear. Thus, this enables freedom of design in relation to the arrangement of the individual components, or adaptation to the existing available space situation. Furthermore, owing to the bearing positioned between the piston and the pressure bolts, the pressure bolts can pass through the housing of the differential transmission and can rotate with it, which makes for a compact structure. Moreover, thanks to the pressure plate the pressure bolts can press evenly against one side of the clutch during a translational movement of the piston.

In accordance with a further embodiment of the invention, the bearing is formed in the manner of an axial needle bearing. Advantageously, this enables a very compact structure and reliable design of an axial bearing to be produced.

In a further development of the invention, the pressure bolts are pre-stressed against the pressure plate by springs. During return movement of the piston this causes the pressure bolts as well to reliably move back again to their starting position, so ensuring normal operation of the differential transmission.

According to a further advantageous embodiment of the invention, the spring element in the area of the piston is in the form of a cup spring. In this way very compact pre-stressing of the piston in the axial direction can be achieved.

A further design feature of the invention is that the membrane is fixed between the main and actuating chambers by means of clamping rings. Advantageously, in this way the membrane is reliably held in position, on the one hand ensuring reliable separation of the main chamber from the actuating chamber, and on the other hand enabling the clutch to be actuated.

In addition, the clamping rings are advantageously held in position indirectly or directly by retaining rings. This measure further increases the reliability of the system.

In another advantageous embodiment of the invention, the clutch is in the form of a disk clutch. In this way, depending on the number of disks the clutch can be made very compact, while depending on the force pressing the disks against one another, the housing can be only partially coupled to the output gear if the clutch is operated with slip.

In a further development of the invention the differential gearbox is in the form of a bevel gear differential. By using a differential gearbox of that type a compact arrangement can be realized in the motor vehicle transmission.

Another feature of the invention is that the membrane consists of a polymer material. The choice of such a material ensures reliable functioning of the membrane even over a lengthy period of use.

BRIEF DESCRIPTION OF THE DRAWINGS

Below, further invention-improving measures are explained in more detail together with the description of a preferred embodiment of the invention, with reference to the figures which show.

DETAILED DESCRIPTION OF THE DRAWINGS

Figure 1:
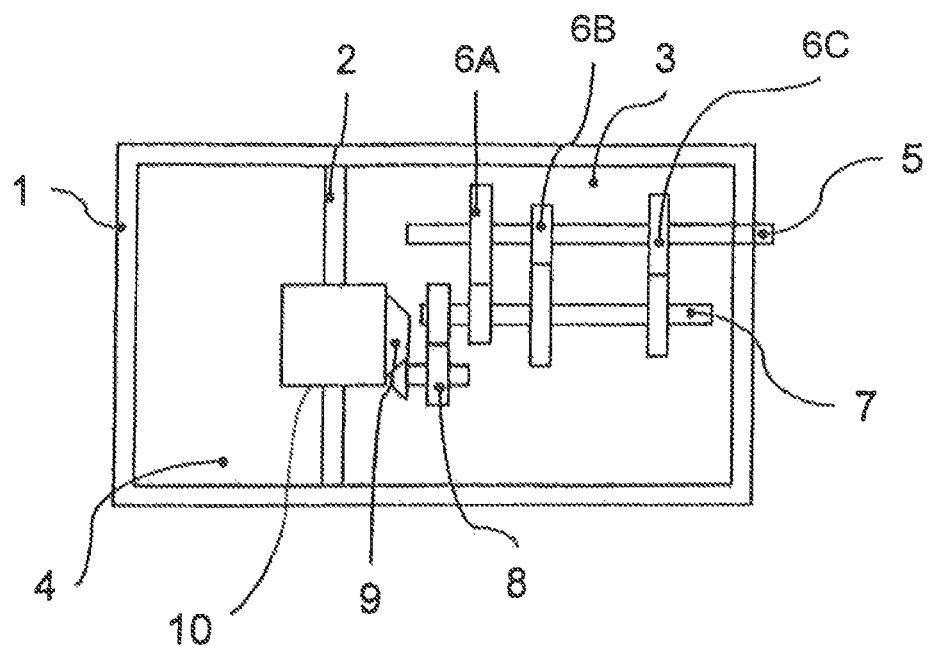
FIG. 1: A very schematic representation of the motor vehicle transmission according to the invention.

FIG. 1 shows a very schematic representation of the motor vehicle transmission according to the invention, within the transmission housing 1 of which a main chamber 3 and an actuating chamber 4 are defined by a partition wall 2. In the main chamber 3 is provided an input shaft 5 which is connected with a motor—not shown here—and which transmits its rotation to a main shaft 7 with a corresponding transmission ratio by virtue of the selection of one among a plurality of gearwheel pairs 6A-6C. In turn, the main shaft 7 is connected by a driving gearset 8 to the housing 9 of a differential gearbox 10, this area being represented in FIG. 1 only as a 'black box'.

Figure 2:
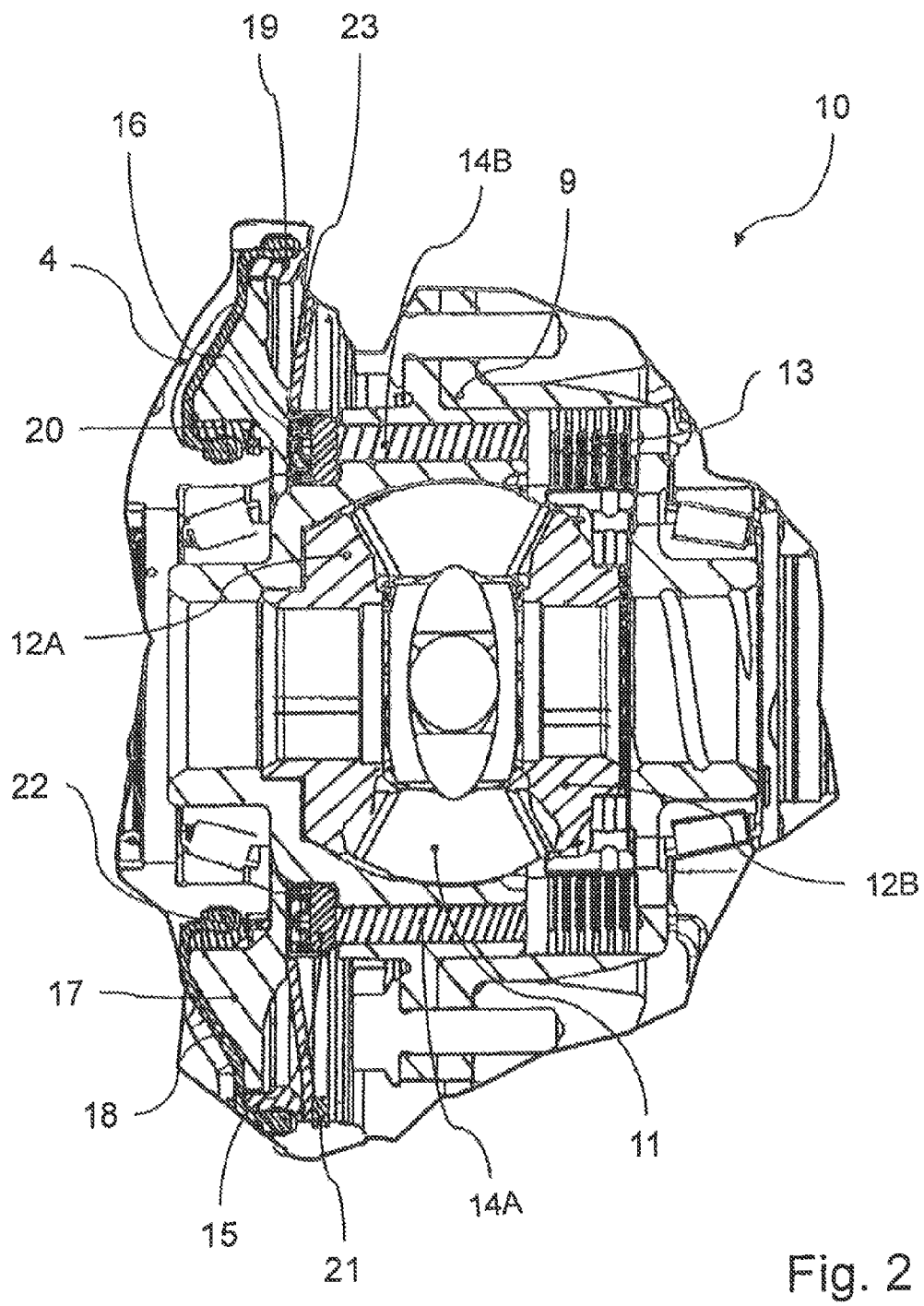
FIG. 2: A detailed perspective view in the area of a differential gearbox of the motor vehicle transmission according to the invention.

FIG. 2 shows a more detailed, sectioned view of the area of the differential gearbox 10. From this it can be seen that in its inside space, the housing 9 of the differential gearbox 10 made as a bevel gear differential has compensating elements 11 by means of which, when the housing 9 rotates, the rotational movement is transmitted to two output gears 12A and 12B. In a manner known to those with an understanding of the field, by means of a compensatory movement of the compensating elements 11, the output gears 12A and 12B can be made to rotate at different speeds. However, in order to suppress this selectively in certain driving situations, a clutch 13 is positioned between the output gear 12B and the housing 9, whose first side is connected to the housing 9 and whose second side is connected to the output gear 12B. When this clutch 13 is actuated the output gear 12B is coupled to the housing 9 so that the two elements rotate at the same speed, and as a result the output gear 12A is entrained as well by virtue of the compensating elements 11 and also rotates at the same speed, so that overall the differential action of the differential gearbox 10 is bridged across. Now actuation of the clutch 13 is initiated in that, by virtue of a translational movement of a piston 17, pressure bolts 14A and 14B are pushed by a pressure plate 15 and a bearing 16 axially toward the clutch 13, so that with their ends they exert a contact pressure on one side of the clutch 13. During this the pressure bolts 14A and 14B rotate together with the housing 9 and the movement relative to the piston 17 is enabled by the bearing 16. The translational movement of the piston 17 is produced by a controlled pressure build-up in the actuating chamber 4 by hydraulic fluid. However, to separate the actuating chamber 4 completely during this and prevent any escape of hydraulic fluid from the actuating chamber 4, a membrane 18 is provided between the piston 17 and the actuating chamber, whose shape changes as pressure builds up in the actuating chamber 4 so that it pushes the piston 17 in its translational direction. To secure the membrane 18, it is fixed by an outer clamping ring 19 and an inner clamping ring 20, the two clamping rings 19 and 20 being held in position by respective retaining rings 21 and 22. In addition a cup spring 23 is positioned between the retaining ring 21 and the outer clamping ring 19, which pre-stresses the piston 17 against the membrane 18.

Figure 3:
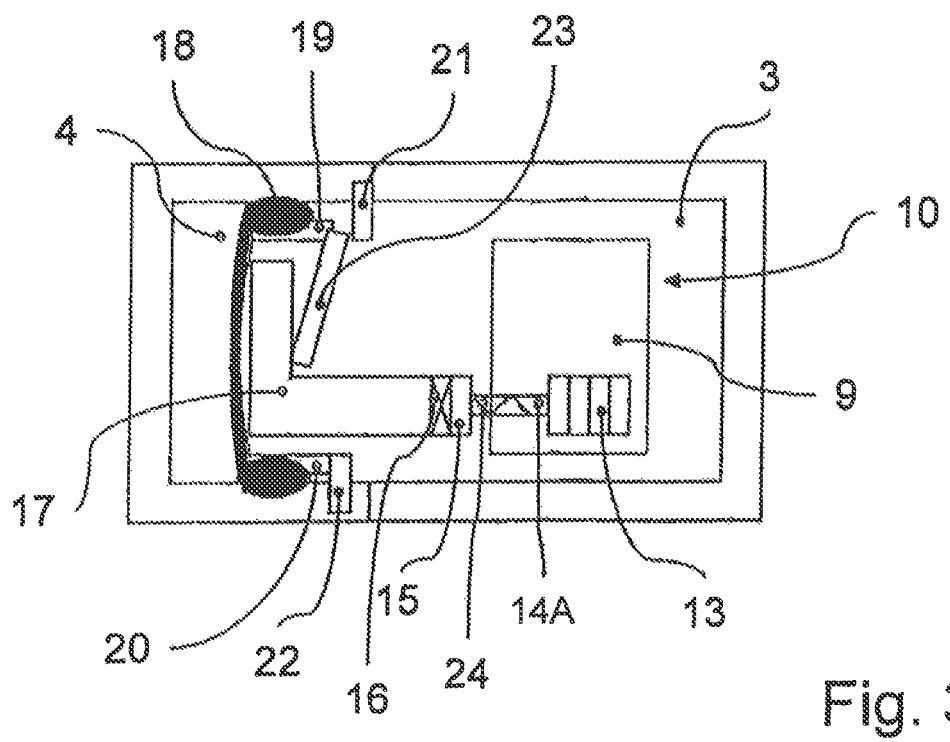
FIG. 3: A schematic detailed view in the area of the differential gearbox.

To make the system even more clear, FIG. 3 also shows a very schematic view of the area in FIG. 2. From this view it can also be seen that in the area of each pressure bolt 14A a spring 24 is provided, which pre-stresses the associated pressure bolt 14A against the pressure plate 15 and accordingly ensures that the clutch 13 opens when the pressure drops in the actuating chamber 4.

Thanks to the design of a motor vehicle transmission according to the invention, it is accordingly possible to integrate a differential gearbox 10 with a locking device in the form of a clutch 13 into the main chamber 3, and at the same time to prevent any mixing of the hydraulic fluid from the actuating chamber 4 with the transmission oil present in the main chamber 3.

INDEXES

1 Transmission housing
2 Partition wall
3 Main chamber
4 Actuating chamber
5 Input shaft
6A-6C Gearwheel pairs
7 Main shaft
8 Driving gearset
9 Housing
10 Differential gearbox
11 Compensating elements
12A, 12B Drive wheels
13 Clutch
14A, 14B Pressure bolts
15 Pressure plate
16 Bearing
17 Piston
18 Membrane
19 Outer clamping ring
20 Inner clamping ring
21, 22 Retaining rings
23 Cup spring
24 Spring

The invention claimed is:

1. A motor vehicle transmission with a main chamber (3) in which rotation of an input shaft (5) is converted and transmitted to a main shaft (7) which is connected to a housing (9) of a differential gearbox (10), the housing (9) drives two output gears (12A, 12B) such that different rotational speeds of the two output gears (12A, 12B) are produced by compensating elements (11) of the differential gearbox (10), a clutch (13) being provided between one of the two output gears (12A, 12B) and the housing (9),
the clutch (13) having a first side connected to the housing (9) and a second side connected to the one of the two output gears (12B) such that the first and the second sides are brought into contact with one another by building up pressure in an actuating chamber (4) in order to couple the one of the two output gears (12B) to the housing (9) of the differential gearbox (10),
the actuating chamber (4) being completely separated from the main chamber (3), and
an impermeable membrane (18) being provided as a separator in an area of the differential gearbox (10), and a shape of the membrane (18) changes as pressure builds up in the actuating chamber (4) and thereby actuates the clutch (13) via an actuating device.

2. The motor vehicle transmission according to claim 1, wherein the actuating device comprises a piston (17) which is pre-stressed by a spring element against a side of the membrane (18) facing away from the actuating chamber (4) and which converts the change in shape of the membrane (18) into translational movement for actuating the clutch (13).

3. The motor vehicle transmission according to claim 2, wherein a bearing (16), a pressure plate (15) and a plurality of pressure bolts (14A, 14B) are connected downstream from the piston (17) such that, during the translational movement of the piston (17), the pressure bolts are displaced so that their ends, facing away from the pressure plate (15), come in contact with one of the first and the second sides of the clutch (13).

4. The motor vehicle transmission according to claim 3, wherein the bearing (16) is an axial needle bearing.

5. The motor vehicle transmission according to claim 3, wherein the pressure bolts (14A, 14B) are pre-stressed against the pressure plate (15) by springs (24).

6. The motor vehicle transmission according to claim 2, wherein the spring element in the area of the piston (17) is a cup spring (23).

7. The motor vehicle transmission according to claim 1, wherein the membrane (18) is fixed between the main chamber (3) and the actuating chamber (4) by clamping rings (19, 20).

8. The motor vehicle transmission according to claim 7, wherein retaining rings (21, 22) one of directly or indirectly hold the clamping rings (19, 20) in position.

9. The motor vehicle transmission according to claim 1, wherein the clutch (13) is a disk clutch.

10. The motor vehicle transmission according to claim 1, wherein the differential gearbox (10) is a bevel gear differential.

11. The motor vehicle transmission according to claim 1, wherein the membrane (18) comprises a polymer material.

* * * * *